Nov. 24, 1942.  A. L. PARKER  2,303,061
APPARATUS FOR PREPARING FLARED END TUBES
Original Filed April 29, 1938
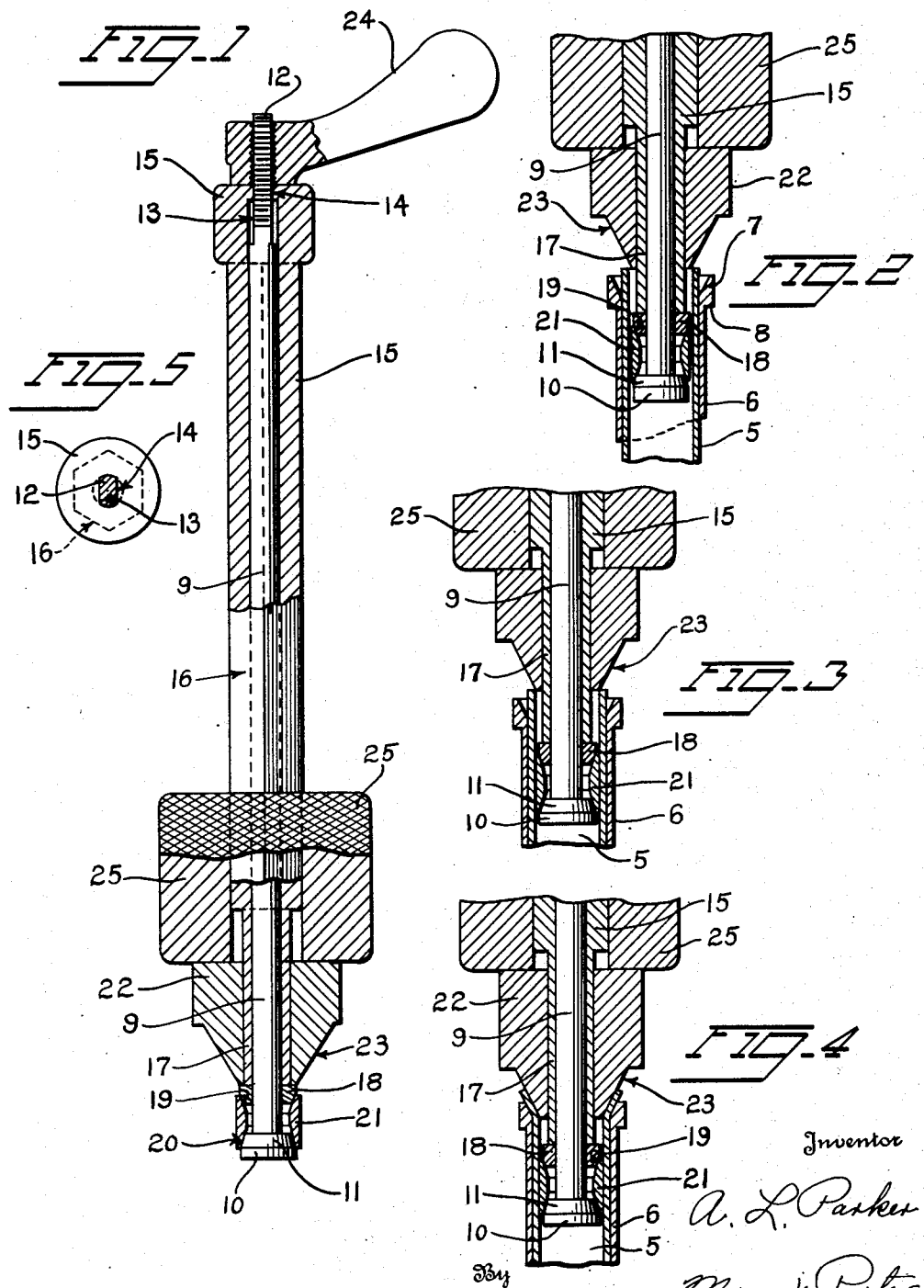

Patented Nov. 24, 1942

2,303,061

UNITED STATES PATENT OFFICE 2,303,061

APPARATUS FOR PREPARING FLARED END TUBES

Arthur L. Parker, Cleveland, Ohio

Original application April 29, 1938, Serial No. 205,102. Divided and this application March 31, 1941, Serial No. 386,203

8 Claims. (Cl. 153—79)

The invention relates generally to tube couplings and has for an object to provide a novel apparatus for securing the tubes to be coupled in the sleeves which surround and protect them and serve in part to clamp them in place in the complete couplings, and for flaring the tube ends preparatory to the formation of said couplings.

In the formation of certain forms of tube couplings, of which my prior Patent 1,893,442, issued January 3, 1933, forms an example, it is customary to provide the tubes with flared ends and to clamp said ends between opposing coniform male and female clamping surfaces, the latter of which are formed in sleeves which snugly surround the tubes to protect them from damaging vibration and which include shoulders engaged by nuts adjustable along the axis of the tubes and sleeves to seat the sleeves in clamping engagement with the flared tube and the opposing male clamping surface. When any appreciable clearance is permitted between the sleeves and the tube portions which they surround, vibration of the coupled tubes is permitted and breakage often results. In my present invention, I seek to remedy these evils by providing a novel apparatus for first expanding a tube end within its protective sleeve to engage them in permanent intimate wall-to-wall contact, and for then flaring the end portion of the tube against an opposed clamping surface of the protective sleeve.

Another object of the invention is to provide a novel tube expanding and flaring tool including an expanding chuck or collet insertible into the end of the tube and its surrounding sleeve, a coniform flaring head movable longitudinally relative to said chuck and engageable in the end of said tube, and novel means for imparting hammer blows to the flaring head for moving it in flaring engagement with the tube end.

With the above and other objects in view which will more fully appear, the nature of the invention will be more clearly understood by following the description, the appended claims, and the several views illustrated in the accompanying drawing.

In the drawing—

Figure 1 is a detail vertical section of the form of tube expanding and flaring apparatus, parts being shown in elevation and the section being taken through the axis of the expanding and flaring devices.

Figure 2 is a fragmentary sectional view illustrating the expanding chuck inserted freely into the end of the tube to be expanded and flared.

Figure 3 is a view similar to Figure 2, the expanding chuck functioning to expand the tube into intimate contact with the surrounding sleeve.

Figure 4 is a view similar to Figure 3 and illustrates the function of flaring the tube end.

Figure 5 is a detail end view of the slide guide sleeve.

This application is a division of my parent application for U. S. Letters Patent Ser. No. 205,102, filed April 29, 1938, now Patent No. 2,266,795.

In the drawing, I have illustrated a tube 5 which is to have its end flared preparatory to coupling. It is customary to surround such tubes with protective sleeves, one of which is indicated at 6. These sleeves surround the tubes and are flared at their ends as at 7 to form a clamping surface for engaging the external flare of the tube end. Each sleeve includes a clamping shoulder 8 engageable, in the completed coupling, by a nut adjustable axially with respect to the tube and sleeve for moving the flared end 7 of the sleeve and the flared end of the tube against a male clamping surface provided in the coupling. In practicing the invention, a sleeve 8 is slipped over the end of a tube 5, the tube is then expanded to engage the sleeve in permanent, intimate wall-to-wall contact so as to eliminate all space which would permit the tube to vibrate independently of its protective sleeve, and the end of the tube is then flared by use of novel apparatus soon to be described.

The herein disclosed tube expanding and flaring tool includes a longitudinal rod 9 equipped at one end with a head 10 having tapered side wall portions 11. At its upper end the rod is externally threaded as at 12 and includes a flattened portion 13 for engagement with a similarly flattened portion 14 formed in the end of the slide guide and chuck actuator sleeve 15.

The main body portion of the sleeve 15 is hexagonal or non-circular at its outer surface, as indicated at 16, and includes a reduced end portion 17 engageable with a spreader member 18 slidable along the rod 9 in cooperative spaced relation with the head 10 of the rod. The spreader 18 includes a tapered wall portion 19 for cooperating with the tapered wall portion 11 in engaging in the flared ends 20 of and spreading the split chuck sleeve 21. The spreader sleeve or collar 18 and the actuator sleeve 15 can properly be collectively termed actuator sleeve-means because by movement along the rod 9 and engagement of this collective means with the chuck sleeve 21, said chuck sleeve is actuated or expanded.

A flaring head 22 is slidably mounted on the reduced extension 17 of the sleeve 15 and includes a coniform flaring portion 23 engageable in the end of the tube clamped by the chuck for the purpose of flaring the same.

A rod moving handle 24 is threaded on the threaded end 12 of the rod, and a heavy slide or hammer block 25 is slidably mounted on the non-circular exterior 16 of the sleeve 15.

In using the tool for expanding and flaring a tube, the chuck is inserted in the end of the sleeve surrounded tube, as shown in Figure 2, after which the handle member 24 is manipulated to draw the rod 9 longitudinally in the sleeve 15 and cause expansion of the chuck sleeve 21, as shown in Figure 3 of the drawing, for the purpose of expanding the tube into intimate contact with its surrounding sleeve.

After the tube is thus expanded and clamped, the hammer block 25 is rapidly slid back and forth along the sleeve 15 to impart hammer blows to the head 22, 23 and force the coniform portion 23 into the tube for flaring it in the manner shown in Figure 4.

In the foregoing description I have disclosed novel apparatus by which a tube to be coupled is expanded into permanent, intimate wall-to-wall contact with its surrounding protective sleeve and then flared to prepare it for ultimate coupling. The details of construction and the advantages of the apparatus will be readily understood by those skilled in the art to which the invention relates.

It is of course to be understood that the details of structure and arrangement of parts may be variously changed and modified without departing from the spirit and scope of my invention.

I claim:

1. A tube end flaring tool comprising, an expansible chuck insertible into the end of the tube, means for expanding the chuck to secure it in the tube, a coniform head movable into the tube end toward the chuck for flaring said tube end, and means axially aligned with and reciprocable relatively to the head for imparting hammer blows thereto for moving said head into said tube end.

2. A tube end flaring tool comprising, a rod having an abutment head at one end and externally threaded at its other end, an expansible chuck sleeve engaging said head, actuator sleeve-means movable along said rod and engaging said chuck sleeve, means engaging said actuator sleeve-means and threadable on said rod end to cause the actuator sleeve-means to expand the chuck sleeve and grip in a tube to be flared, a coniform flaring head slidable on said actuator sleeve-means for engaging in and flaring a tube end gripped by the chuck sleeve, and a hammer ring slidable along said actuator sleeve-means and engageable with the flaring head for imparting hammer blows thereto.

3. A tube flaring tool comprising a rod, an expansible chuck carried by said rod and insertible into the end of a tube to be flared, means for expanding the chuck into contact with the inner wall of said tube for securing the chuck and rod therein and including an actuator sleeve insertible into the tube, a coniform tube end flaring head movable along said sleeve and having a lead end receivable in the tube end, and a vibratory hammer member movable on the sleeve for successive forcible engagements with the head to impart tube flaring movements to said head.

4. A tube flaring tool comprising a rod, an expansible chuck carried by said rod and insertible into the end of a tube to be flared, means for expanding the chuck into contact with the inner wall of said tube for securing the chuck and rod therein and including an actuator sleeve insertible into the tube, a coniform tube end flaring head movable along said sleeve and having a lead end receivable in the tube end, and a vibratory hammer member movable on the sleeve for successive forcible engagements with the head to impart tube flaring movements to said head, said chuck expanding means including a member threadable on said rod and engageable with said sleeve for causing it to move along said rod into expanding engagement with the chuck.

5. A tube flaring tool comprising a rod, an expansible chuck carried by said rod and insertible into the end of a tube to be flared, means for expanding the chuck into contact with the inner wall of said tube for securing the chuck and rod therein and including an actuator sleeve insertible into the tube, a coniform tube end flaring head movable along said sleeve and having a lead end receivable in the tube end, and a vibratory hammer member movable on the sleeve for successive forcible engagements with the head to impart tube flaring movements to said head, said chuck expanding means including a member threadable on said rod and engageable with said sleeve for causing it to move along said rod into expanding engagement with the chuck, and said chuck comprising a coniform clutch head fixed on said rod, a coniform collar movable along said rod and engaged by the sleeve, and a split sleeve surrounding the rod and engaged at its ends by said coniform clutch head and collar.

6. A tube flaring tool comprising a rod, an expansible chuck carried by said rod and insertible into the end of a tube to be flared, means for expanding the chuck into contact with the inner wall of said tube for securing the chuck and rod therein and including an actuator sleeve insertible into the tube, a coniform tube end flaring head movable along said sleeve and having a lead end receivable in the tube end, a vibratory hammer member movable on the sleeve for successive forcible engagements with the head to impart tube flaring movements to said head, said chuck expanding means including a member threadable on said rod and engageable with said sleeve for causing it to move along said rod into expanding engagement with the chuck, and said chuck comprising a coniform clutch head fixed on said rod, a coniform collar movable along said rod and engaged by the sleeve, and a split sleeve surrounding the rod and engaged at its ends by said coniform clutch head and collar, and means for preventing relative rotation between the rod and the actuator sleeve.

7. A tube flaring tool comprising a rod externally threaded at one end and having a coniform clutch head fixed upon its other end, a coniform clutch collar slidably mounted on said rod, a split clutch sleeve surrounding said rod and engaged at its ends by said head and collar and being expandable thereby upon movement of the collar toward said head, an actuator sleeve surrounding the rod and engaging said collar, means threadably mounted on the threaded end of the rod and engageable with the sleeve for forcing the same into movement imparting engagement with the collar, a coniform tube end flaring head movable along the sleeve and having a lead end receivable in the end of a tube to be flared, and a hammer head slidable along the actuator sleeve for imparting hammer blows and tube end flaring movements to said flaring head.

8. A tube flaring tool comprising a rod externally threaded at one end and having a coniform clutch head fixed upon its other end, a coniform clutch collar slidably mounted on said rod, a split clutch sleeve surrounding said rod and engaged at its ends by said head and collar and being expandable thereby upon movement of the collar toward said head, an actuator sleeve surrounding the rod and engaging said collar, means threadably mounted on the threaded end of the rod and engageable with the sleeve for forcing the same into movement imparting engagement with the collar, a coniform tube end flaring head movable along the sleeve and having a lead end receivable in the end of a tube to be flared, and a hammer head slidable along the actuator sleeve for imparting hammer blows and tube end flaring movements to said flaring head, said actuator sleeve and rod having interengaging non-circular portions effective to prevent rotation of one thereof relative to the other.

ARTHUR L. PARKER.